US011914155B2

(12) United States Patent
Zhu et al.

(10) Patent No.: US 11,914,155 B2
(45) Date of Patent: Feb. 27, 2024

(54) AUGMENTED REALITY DEVICE AND DISPLAY METHOD THEREOF

(71) Applicant: HUAWEI TECHNOLOGIES CO., LTD., Shenzhen (CN)

(72) Inventors: Shuaishuai Zhu, Dongguan (CN); Jiuxing Wang, Dongguan (CN); Cheng Lo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/915,401

(22) PCT Filed: Mar. 18, 2021

(86) PCT No.: PCT/CN2021/081545
§ 371 (c)(1),
(2) Date: Sep. 28, 2022

(87) PCT Pub. No.: WO2021/197082
PCT Pub. Date: Oct. 7, 2021

(65) Prior Publication Data
US 2023/0129018 A1 Apr. 27, 2023

(30) Foreign Application Priority Data
Mar. 28, 2020 (CN) .......................... 202010233012.4

(51) Int. Cl.
*G02B 27/01* (2006.01)
*G02F 1/1335* (2006.01)
(Continued)

(52) U.S. Cl.
CPC ..... *G02B 27/0172* (2013.01); *G02B 27/0179* (2013.01); *G02C 7/081* (2013.01);
(Continued)

(58) Field of Classification Search
CPC .............. G02B 27/017; G02B 27/0172; G02B 2027/0178; G02B 2027/0187;
(Continued)

(56) References Cited

U.S. PATENT DOCUMENTS

| 9,116,337 B1 | 8/2015 | Miao |
| 10,319,154 B1 | 6/2019 | Chakravarthula et al. |

(Continued)

FOREIGN PATENT DOCUMENTS

| CN | 102540463 A | 7/2012 |
| CN | 104485427 A | 4/2015 |

(Continued)

OTHER PUBLICATIONS

"Twisted nematic field effect—Wikipedia," XP055324354, Total 5 pages (Nov. 29, 2016).

*Primary Examiner* — Jia X Pan
(74) *Attorney, Agent, or Firm* — Leydig, Voit & Mayer, Ltd.

(57) ABSTRACT

An augmented reality device includes an eyeglass frame and a combiner mounted on the eyeglass frame. The combiner includes an inner surface and an outer surface disposed opposite the inner surface. The device further includes an active shutter lens mounted on the combiner and an image projector mounted on the eyeglass frame and configured to project display light to the combiner such that a first portion of the display light is emitted from the inner surface of the combiner and a second portion of the display light is emitted from the outer surface of the combiner. The device additionally includes a processor coupled to the image projector and the active shutter lens. The active shutter lens is configured to shield the display light emitted from the outer surface of the combiner. The combiner is configured to emit ambient light from the inner surface thereof.

13 Claims, 7 Drawing Sheets

(51) Int. Cl.
*G02F 1/13363* (2006.01)
*G02F 1/139* (2006.01)
*G02C 7/08* (2006.01)
*F21V 8/00* (2006.01)

(52) U.S. Cl.
CPC ...... G02F 1/1396 (2013.01); G02F 1/133531 (2021.01); G02F 1/133638 (2021.01); *G02B 6/005* (2013.01); *G02B 6/0026* (2013.01); *G02B 2027/0178* (2013.01); *G02B 2027/0187* (2013.01); *G02F 2413/01* (2013.01); *G02F 2413/05* (2013.01); *G02F 2413/08* (2013.01)

(58) Field of Classification Search
CPC .. G02B 5/3025; G02B 5/3033; G02B 5/3083; G02F 1/133531; G02F 1/133528; G02F 1/13363; G02F 1/133638
See application file for complete search history.

(56) References Cited

U.S. PATENT DOCUMENTS

| | | |
|---|---|---|
| 2009/0189976 A1 | 7/2009 | Morozov |
| 2012/0236030 A1* | 9/2012 | Border .................. G06F 3/013 |
| | | 345/633 |
| 2018/0322845 A1 | 11/2018 | Machida |
| 2019/0056591 A1 | 2/2019 | Tervo et al. |
| 2019/0378338 A1* | 12/2019 | Bar-Zeev ............. G06T 19/006 |
| 2020/0018962 A1 | 1/2020 | Lu et al. |

FOREIGN PATENT DOCUMENTS

| | | |
|---|---|---|
| CN | 106990532 A | 7/2017 |
| CN | 109387942 A | 2/2019 |
| CN | 110058412 A | 7/2019 |
| CN | 110221439 A | 9/2019 |
| CN | 110618530 A | 12/2019 |
| JP | H10301055 A | 11/1998 |
| JP | 2004046261 A | 2/2004 |
| JP | 5833847 B2 | 12/2015 |
| WO | 2016055838 A1 | 4/2016 |
| WO | 2019178060 A1 | 9/2019 |

* cited by examiner

AUGMENTED REALITY DEVICE AND DISPLAY METHOD THEREOF

CROSS-REFERENCE TO RELATED APPLICATIONS

This application is a continuation of International Application No. PCT/CN2021/081545, filed on Mar. 18, 2021, which claims priority to Chinese Patent Application No. 202010233012.4, filed with the China National Intellectual Property Administration on Mar. 28, 2020 and entitled "AUGMENTED REALITY DEVICE AND DISPLAY METHOD THEREOF," both of which are incorporated herein by reference in their entirety.

TECHNICAL FIELD

This application relates to the display field in which virtuality and reality are combined, and in particular, to an augmented reality device and a display method thereof.

BACKGROUND

A principle of an augmented reality (AR) technology is as follows: A computer-controlled image projector is used to project display light that carries digital content into a human eye to form a virtual scene, and the virtual scene is superposed with an external real scene that can be directly seen by the human eye, so that the human eye observes image information that combines the virtual scene and the external real scene.

In a conventional augmented reality device, a part of the display light projected by the image projector is always emitted from an augmented reality device, and consequently, the display light that carries the digital information is leaked, privacy of a user is disclosed, and privacy of the user is reduced.

SUMMARY

This application provides an augmented reality device and a display method thereof, to reduce a possibility that display light is emitted from the augmented reality device, prevent display light that carries digital information from being leaked, and improve privacy of a user.

An augmented reality device shown in this application includes an eyeglass frame, a combiner, an active shutter lens, an image projector, and a processor. The combiner is mounted on the eyeglass frame. The combiner includes an inner surface and an outer surface that are disposed opposite to each other, and the active shutter lens is mounted on the outer surface of the combiner. The image projector is mounted on the eyeglass frame. The processor is coupled to the image projector and the active shutter lens.

The processor is configured to turn on the image projector and turn off the active shutter lens, and the image projector is configured to project display light to the combiner. The display light is light that carries digital content. Some of the display light is emitted from the inner surface of the combiner, some of the display light is emitted from the outer surface of the combiner, and the active shutter lens shields the display light emitted from the outer surface of the combiner, to prevent the display light emitted from the outer surface of the combiner from being emitted to the external environment through the active shutter lens and to prevent the display light that carries the digital content from being leaked. This can not only improve privacy of a user and sociality of the augmented reality device, but can also prevent the leaked display light from forming a small display window on a surface of the augmented reality device. The appearance when the user uses the augmented reality device is thereby improved and refined.

The processor is further configured to turn off the image projector and turn on the active shutter lens. After passing through the active shutter lens, ambient light enters the combiner from the outer surface of the combiner and is emitted from the inner surface of the combiner so that the user can observe an external real scene through the combiner and the active shutter lens. It is thereby ensured that the augmented reality device has specific transmittance.

The inner surface of the combiner is a surface of the combiner that faces the user when the augmented reality device is worn on the head of the user, i.e. a surface of the combiner that faces a human eye. The outer surface of the combiner is a surface of the combiner that faces away from the user when the augmented reality device is worn on the head of the user, i.e. a surface of the combiner that faces away from the human eye and that faces the external environment.

The active shutter lens is a lens that can be quickly turned on or off under the control of the processor. When the processor turns on the active shutter lens (i.e. when the active shutter lens is in an on state), transmittance of the active shutter lens is relatively high and light may be propagated normally through the active shutter lens. When the processor turns off the active shutter lens (i.e. when the active shutter lens is in an off state), transmittance of the active shutter lens is close to 0 and the active shutter lens shields light. For example, when the active shutter lens is in an off state, it absorbs the light such that the light cannot be propagated through the active shutter lens.

In an implementation, the outer surface of the combiner includes a light exit region, the display light emitted from the outer surface of the combiner is emitted from the light exit region on the outer surface of the combiner, and the active shutter lens covers the light exit region on the outer surface of the combiner. When the processor turns on the image projector and turns off the active shutter lens, the display light emitted from the outer surface of the combiner is not emitted to the external environment, and the display light that carries the digital content is thereby prevented from being leaked.

In another implementation, the active shutter lens covers the outer surface of the combiner to ensure appearance integrity and consistency of the augmented reality device and to improve and refine the appearance of the augmented reality device. In addition, compared with a case in which the active shutter lens covers only the light exit region on the outer surface of the combiner, if the active shutter lens covers the outer surface of the combiner, not only is an assembling process of the active shutter lens made less difficult, but the active shutter lens does not need to be additionally processed, so that difficulty in processing the active shutter lens is reduced, and production costs of the active shutter lens are reduced.

In an implementation, the active shutter lens is a liquid crystal light valve including a liquid crystal box, a first polarizer, and a second polarizer. The liquid crystal box is coupled to the processor, the first polarizer is located on a side of the liquid crystal box distal from the combiner, and the second polarizer is located between the liquid crystal box and the combiner. In other words, the second polarizer is located on a side that is of the liquid crystal box and that is away from the first polarizer; or in other words, the second polarizer is located on the side that is of the liquid crystal box and that is away from the combiner. An included angle between a light transmission axis direction of the second polarizer and a light transmission axis direction of the first polarizer is 90 degrees. When the processor turns on the active shutter lens, after being filtered by the first polarizer, the ambient light is emitted to the outer surface of the combiner successively through the liquid crystal box and the second polarizer, and is emitted to the human eye from the inner surface of the combiner, so that the human eye can observe an external real environment through the active shutter lens and the combiner.

The liquid crystal light valve is an optical component that delays a phase of light by controlling a refractive index of a liquid crystal molecule by using a voltage.

In an implementation, the active shutter lens is an in-plane switching (IPS)-type liquid crystal light valve.

When the processor turns on the active shutter lens, the liquid crystal light valve is in a powered-on state. After being filtered by the first polarizer, ambient light enters the liquid crystal box, and the liquid crystal box delays a phase of the light emitted from the first polarizer by 7E. Because the light transmission axis direction of the second polarizer and the light transmission axis direction of the first polarizer are perpendicular to each other, light emitted from the liquid crystal box can be emitted to the outer surface of the combiner through the second polarizer.

When the processor turns off the active shutter lens, the liquid crystal light valve is in a powered-off state. After being filtered by the first polarizer, the ambient light enters the liquid crystal box, and the liquid crystal box does not change a phase of the light emitted from the first polarizer. Because the light transmission axis direction of the second polarizer and the light transmission axis direction of the first polarizer are perpendicular to each other, the light emitted from the liquid crystal box cannot be emitted to the outer surface of the combiner through the second polarizer, and is therefore totally blocked by second polarized light.

In an implementation, the active shutter lens is a twisted nematic (TN)-type liquid crystal light valve.

When the processor turns on the active shutter lens, the liquid crystal light valve is in a powered-off state. After being filtered by the first polarizer, the ambient light enters the liquid crystal box, and the liquid crystal box delays a phase of the light emitted from the first polarizer by 7E. Because the light transmission axis direction of the second polarizer and the light transmission axis direction of the first polarizer are perpendicular to each other, the light emitted from the liquid crystal box can be emitted to the outer surface of the combiner through the second polarizer.

When the processor turns off the active shutter lens, the liquid crystal light valve is in a powered-on state, and liquid crystal in the liquid crystal box is rotated to a state in which the liquid crystal is perpendicular to the first polarizer. After being filtered by the first polarizer, the ambient light enters the liquid crystal box, and the liquid crystal box does not change a phase of the light emitted from the first polarizer. Because the light transmission axis direction of the second polarizer and the light transmission axis direction of the first polarizer are perpendicular to each other, the light emitted from the liquid crystal box cannot be emitted to the outer surface of the combiner through the second polarizer, and is therefore totally blocked by the second polarizer.

In an implementation, the liquid crystal light valve is a vertical alignment (VA)-type liquid crystal light valve, a super twisted nematic (STN)-type liquid crystal light valve, or a ferroelectric liquid crystal (FLC)-type light valve.

In an implementation, the augmented reality device further includes a quarter-wave plate, and the quarter-wave plate is mounted on a surface that is of the first polarizer and that is away from the liquid crystal light valve; in other words, the quarter-wave plate is mounted on an outer surface of the first polarizer, and an included angle between a fast-axis direction of the quarter-wave plate and the light transmission axis direction of the first polarizer is 45 degrees.

It should be understood that a majority of existing electronic screens are liquid crystal displays (LCD), and light emitted from the liquid crystal display is linearly polarized light. When the user wears the augmented reality device shown in this embodiment to observe the electronic screen, and a line of sight rotates around the electronic screen, regardless of whether a polarization direction of light emitted from the electronic screen is perpendicular to or parallel to the light transmission axis direction of the first polarizer, the quarter-wave plate may attenuate linearly polarized light in any polarization direction to 50%. When the processor turns on the active shutter lens, the quarter-wave plate may reduce a brightness difference existing when the user observes the electronic screen. This helps improve user experience when the user wears the augmented reality device to observe the electronic screen.

In an implementation, the augmented reality device includes two augmented reality components, and the two augmented reality components are mounted on the eyeglass frame at intervals. Each augmented reality component includes the combiner, the image projector, and the active shutter lens, and combiners of the two augmented reality components are disposed side by side.

In the augmented reality device shown in this implementation, one augmented reality component corresponds to the left eye of the user, and the other augmented reality component corresponds to the right eye of the user. Structures of the two augmented reality components are the same; in other words, while ensuring transmittance of the augmented reality device, both the two augmented reality components prevent the display light that carries the digital content from being leaked.

In an implementation, the active shutter lens of each augmented reality component is a liquid crystal light valve, the active shutter lens of each augmented reality component includes a liquid crystal box, a first polarizer, and a second polarizer, the liquid crystal box of each augmented reality component is coupled to the processor, the first polarizer of each augmented reality component is located on a side that is of the liquid crystal box of the augmented reality component and that is away from the combiner, and the second polarizer of each augmented reality component is located between the liquid crystal box and the combiner of the augmented reality component. In other words, the second polarizer of each augmented reality component is located on a side that is of the liquid crystal box of the augmented reality component and that is away from the first polarizer; or in other words, the second polarizer of each augmented reality component is located on a side that is of the liquid crystal box of the augmented reality component and that faces the combiner. An included angle between light transmission axis directions of the first polarizer and the second polarizer of each augmented reality component is 90 degrees.

When the processor turns on the active shutter lens, after being filtered by the first polarizer, the ambient light is emitted to the outer surface of the combiner successively through the liquid crystal box and the second polarizer, and is emitted to the human eye from the inner surface of the combiner, so that both the left eye and the right eye of an operator can observe the external real environment.

In an implementation, the augmented reality device includes two quarter-wave plates. One quarter-wave plate is mounted on an outer surface of one first polarizer, and an included angle between a fast-axis direction of the quarter-wave plate and a light transmission axis direction of the first polarizer is 45 degrees. The other quarter-wave plate is mounted on an outer surface of the other first polarizer, and an included angle between a fast-axis direction of the other quarter-wave plate and a light transmission axis direction of the other first polarizer is 45 degrees. In a process in which the user wears the augmented reality device to observe the electronic screen, a brightness difference existing when the user observes the electronic screen by using the left eye and the right eye is reduced, and this helps improve user experience when the user wears the augmented reality device to observe the electronic screen.

In an implementation, the light transmission axis directions of the two first polarizers are the same, and an included angle between the fast-axis directions of the two quarter-wave plates is 90 degrees; or an included angle between the light transmission axis directions of the two first polarizers is 90 degrees, and the fast-axis directions of the two quarter-wave plates are the same, so that when the user wears the augmented reality device to observe the electronic device, polarized light whose polarization directions are perpendicular to each other, such as left and right polarized light, separately pass through the two augmented reality components. In this case, two rays of polarized light whose polarization directions are perpendicular to each other separately enter the left eye and the right eye of the user to form an image. When the processor turns on the active shutter lens, the user can see a three-dimensional (three dimensions, 3D) image. In other words, the augmented reality device shown in this implementation may be further used in a 3D movie theater, and may be compatible with two projection manners: a polarization manner and an active shutter manner.

In an implementation, the augmented reality device further includes a varifocal lens, and the varifocal lens covers the inner surface of the combiner. In other words, the varifocal lens is located on a side that is of the combiner and that is close to the human eye, to correct vision of the user. When the user has a visual problem such as shortsightedness, farsightedness, or astigmatism, the varifocal lens may correct ametropia of the user when the user observes a virtual scene or an external real scene, so that clarity achieved when the user observes the virtual scene or the external real scene is improved, and user experience of the user of using the augmented reality device is improved.

In an implementation, the processor is coupled to the varifocal lens, and the processor is configured to adjust focal power of the varifocal lens. When the user needs to use the augmented reality device, the processor may adjust the focal power of the varifocal lens based on diopter of the user to match the vision of the user, to improve adaptation of the augmented reality device, and improve use flexibility of the augmented reality device.

In an implementation, the augmented reality device further includes an eyeball tracking component, the eyeball tracking component is mounted on the eyeglass frame to track a line of sight of an eyeball, and the processor is coupled to the varifocal lens and the eyeball tracking component.

The processor is configured to: turn off the image projector, and adjust the focal power of the varifocal lens to first focal power, to correct ametropia of the user when the user observes the external real scene, and improve clarity achieved when the user observes the external real scene.

The processor is configured to turn on the image projector, and the eyeball tracking component is configured to obtain a vergence depth of a virtual scene observed by the eyeball. The processor adjusts the focal power of the varifocal lens to second focal power based on an obtaining result of the eyeball tracking component.

Specifically, the eyeball tracking component is configured to: track the line of sight of the eyeball, and obtain, based on the line of sight of the eyeball, a vergence depth of the virtual scene that is being gazed at by the user. The processor changes a virtual image distance of the virtual scene based on the vergence depth, and adjusts a position of the virtual scene to the vergence depth, so that not only the ametropia of the user when the user observes the virtual scene can be corrected, and clarity achieved when the user observes the virtual scene can be improved, but a vergence-accommodation conflict can also be resolved, discomfort when the user uses the augmented reality device can be reduced, and use comfort of the user can be improved.

The first focal power is diopter of the eyeball of the user, and the second focal power is a sum of the first focal power and a reciprocal of a depth of a virtual image observed by the user.

In an implementation, the eyeball tracking component includes one or more infrared light-emitting diodes and one or more infrared cameras. Infrared light emitted by the infrared light-emitting diodes enters the eye of the user, and is reflected by cornea of the human eye into the infrared camera to form an image. The processor obtains an optical axis direction of the eyeball of the user by using a spot position of infrared light in the image. After the optical axis direction of the eyeball is calibrated, a line of sight direction of the user is obtained, a depth of the virtual scene observed by the user is determined based on the line of sight direction of the user, and further, the focal power of the varifocal lens is adjusted to the second focal power.

A display method for the augmented reality device shown in this application is a display method for any one of the foregoing augmented reality devices. The display method includes the following:

In a first time period, the image projector is turned on, the active shutter lens is turned off, and the image projector projects display light to the combiner. Some of the display light is emitted from the inner surface of the combiner, some of the display light is emitted from the outer surface of the combiner, and the active shutter lens shields the display light emitted from the outer surface of the combiner, to prevent the display light emitted from the outer surface of the combiner from being emitted to the external environment through the active shutter lens, and prevent the display light that carries the digital content from being leaked. This can not only improve privacy of the user and sociality of the augmented reality device, but can also prevent the leaked display light from forming a small display window on a surface of the augmented reality device, and improve appearance refinement when the user uses the augmented reality device.

In a second time period, the image projector is turned off, and the active shutter lens is turned on. After passing through the active shutter lens, ambient light enters the combiner from the outer surface of the combiner, and is emitted from the inner surface of the combiner, so that the user can observe an external real scene through the combiner and the active shutter lens, to ensure that the augmented reality device has specific transmittance.

In an implementation, the first time period and the second time period are alternated, to prevent the display light that carries the digital content from being leaked while ensuring the transmittance of the augmented reality device.

In an implementation, the first time period and the second time period form one period, and one period is less than or equal to 1/60 seconds.

It should be understood that flickering frequency that can be perceived by the human eye is 60 Hz. Because one period is less than or equal to 1/60 seconds, in other words, one second includes at least 60 periods, based on a persistence of vision phenomenon (also referred to as a visual pause phenomenon or a duration of vision effect), the human eye cannot perceive switching between the virtual scene and the external real scene, and this is equivalent to that the human eye can not only see the virtual scene, but can also see the external real scene. In other words, the display light leaked from the combiner can be shielded while ensuring the transmittance of the augmented reality device.

BRIEF DESCRIPTION OF THE DRAWINGS

To describe the technical solutions in embodiments of this application or in the background more clearly, the accompanying drawings provide the following.

DETAILED DESCRIPTION OF THE EMBODIMENTS

The following describes embodiments of this application with reference to the accompanying drawings.

Figure 1:
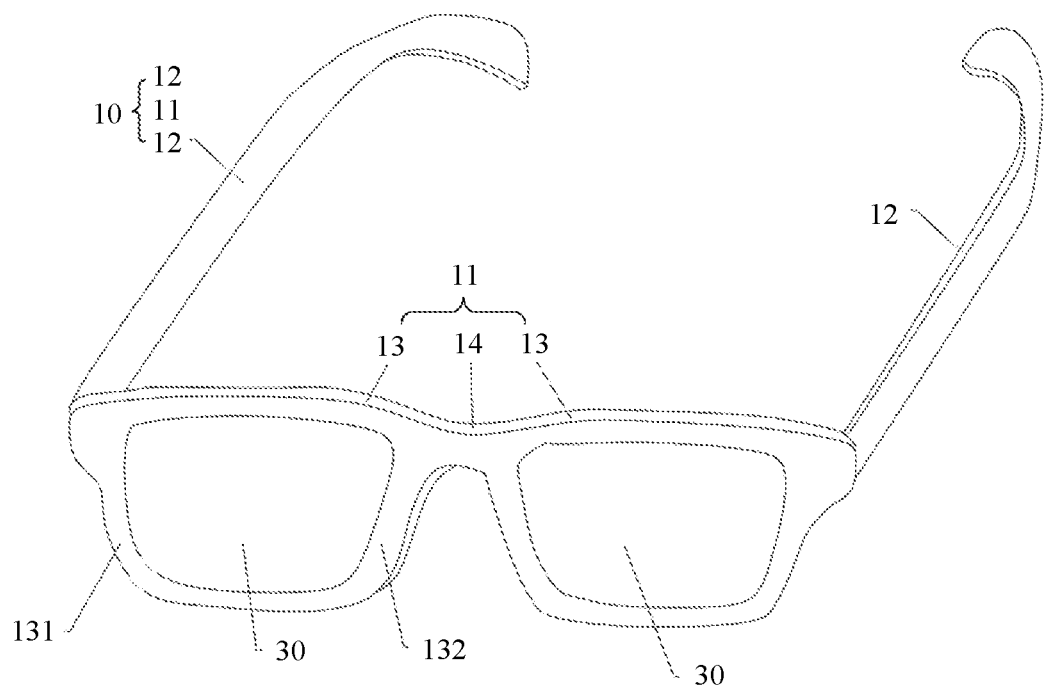
FIG. 1 is a schematic diagram of a structure of an augmented reality device according to an embodiment.

FIG. 1 is a schematic diagram of a structure of an augmented reality device 100 according to an embodiment of this application.

The augmented reality device 100 may be an electronic product that combines digital content and a real scenario, such as AR glasses, an AR helmet, mixed reality (MR) glasses, or an MR helmet. The augmented reality device 100 in the embodiment shown in FIG. 1 is described by using AR glasses as an example.

In this embodiment, the augmented reality device 100 includes an eyeglass frame and an augmented reality component 30 mounted on the eyeglass frame 10. There are two augmented reality components 30, and the two augmented reality components 30 are mounted on the eyeglass frame 10 at intervals.

The eyeglass frame 10 includes a rim 11 and a temple 12 connected to the rim 11. There are two temples 12, and the two temples 12 are connected to opposite ends of the rim 11. It should be noted that in another embodiment, the eyeglass frame 10 may alternatively include a rim 11 and a fastening band connected to the rim 11. This is not specifically limited in this application.

The rim 11 includes two bezels 13 and a bridge 14 connected between the two bezels 13. Each bezel 13 includes a first bezel 131 away from the bridge 14 and a second bezel 132 disposed opposite to the first bezel 131. An accommodating cavity is disposed within the first bezel 131, and the accommodating cavity of the first bezel 131 is used to accommodate an electronic component of the augmented reality device 100. The bridge 14 is integrated with the two bezels 13, to simplify a forming process of the rim 11 and increase overall strength of the rim 11. A material of the rim 11 includes and is not limited to metal, plastic, resin, a natural material, or the like. It should be understood that the rim 11 is not limited to a full-frame rim shown in FIG. 1, and may alternatively be a half-frame or no-frame rim.

The two temples 12 are rotatably connected to the opposite ends of the rim 11. Specifically, the two temples 12 are separately rotatably connected to the two bezels 13 of the rim 11. The two temples 12 are separately connected to first bezels 131 of the two bezels 13. When the augmented reality device 100 is in an unfolded state (as shown in FIG. 1), the two temples 12 rotate relative to the rim 11 to a state in which the two temples 12 are opposite to each other. In this case, the two temples 12 of the augmented reality device 100 may be separately mounted on two ears of a user, and the bridge 14 is mounted on the nose of the user, so that the augmented reality device 100 is worn on the head of the user. When the augmented reality device 100 is in a folded state, the two temples 12 rotate relative to the rim 11 to a state in which the two temples 12 at least partially overlap each other and are accommodated within the rim 11. In this case, the augmented reality device 100 may be put away. It may be understood that, in another embodiment, the two temples 12 may be separately fastened to the first bezels 131 of the two bezels 13; or the two temples 12 may be integrated with the rim 11; in other words, the augmented reality device 100 is always in an unfolded state. This is not specifically limited in this application. It should be noted that an accommodating cavity may also be disposed within the temples 12, and the accommodating cavity of the temples 12 may also accommodate the electronic component of the augmented reality device 100.

It should be noted that azimuth words such as "inner side" and "outer side" that are used when the augmented reality device 100 is mentioned in this application are mainly described based on an azimuth when the augmented reality device 100 is worn by the user on the head. When the augmented reality device 100 is worn by the user, a side close to the head of the user is an inner side, and a side away from the head of the user is an outer side. This does not limit an azimuth of the augmented reality device 100 in another scenario.

Figure 2:
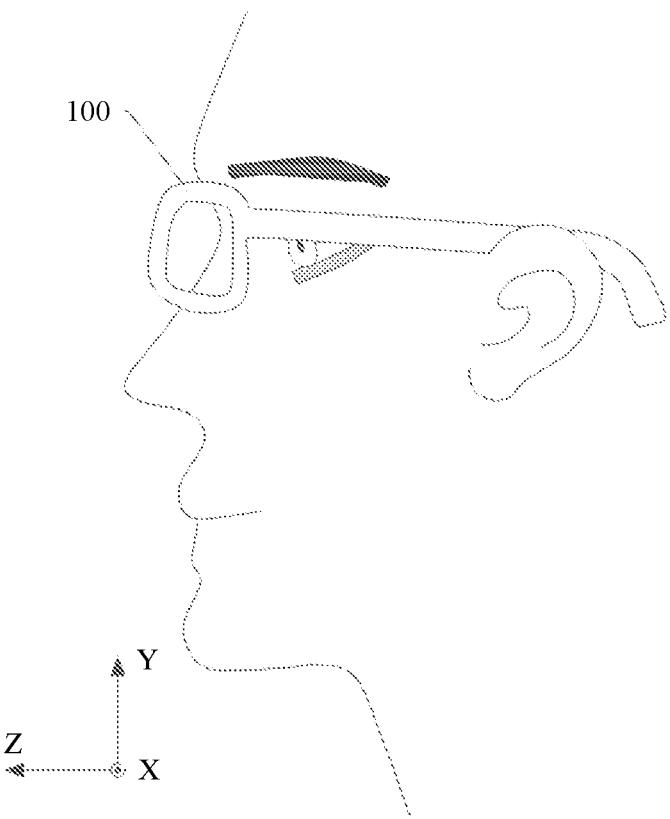
FIG. 2 is a schematic diagram of a structure when the augmented reality device shown in FIG. 1 is worn on a head of a user.
Figure 3:
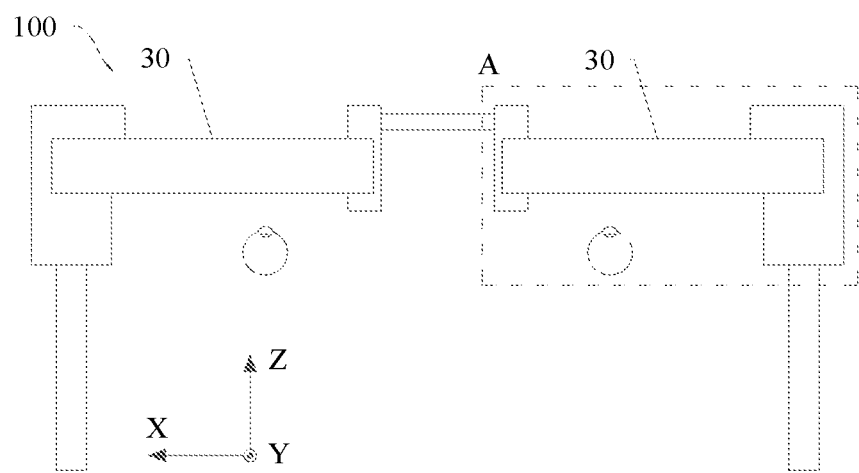
FIG. 3 is a schematic diagram of a simplified structure of the structure shown in FIG. 2.

Refer to both FIG. 2 and FIG. 3. FIG. 2 is a schematic diagram of a structure when the augmented reality device 100 shown in FIG. 1 is worn on the head of a user. FIG. 3 is a schematic diagram of a simplified structure of the structure shown in FIG. 2.

Subsequently, for ease of description, as shown in FIG. 2 and FIG. 3, a length direction of the augmented reality device 100 is defined as an X-axis direction, a width direction of the augmented reality device 100 is a Y-axis direction, a thickness direction of the augmented reality device 100 is a Z-axis direction, and the X-direction, the Y-direction, and the Z-direction are pairwise perpendicular to each other. The X-axis direction is a direction from one bezel 13 on the rim 11 to the other bezel 13, and the Z-axis direction is a direction from the rim 11 to the temple 12.

In this embodiment, the two augmented reality components 30 have a same structure. Specifically, the two augmented reality components 30 are separately mounted on the two bezels 13 on the rim 11. When the augmented reality device 100 is worn on the head of the user, one augmented reality component 30 corresponds to the left eye of the user, and the other augmented reality component 30 corresponds to the right eye of the user. In this case, the eyes of the user may observe a virtual scene and a real scene by using the two augmented reality components 30. It should be noted that in another embodiment, structures of the two augmented reality components 30 may alternatively be different. This is not specifically limited in this application.

Subsequently, for ease of understanding, the structure of the augmented reality component 30 is specifically described by using the augmented reality component 30 corresponding to the right eye of the user as an example.

Figure 4:
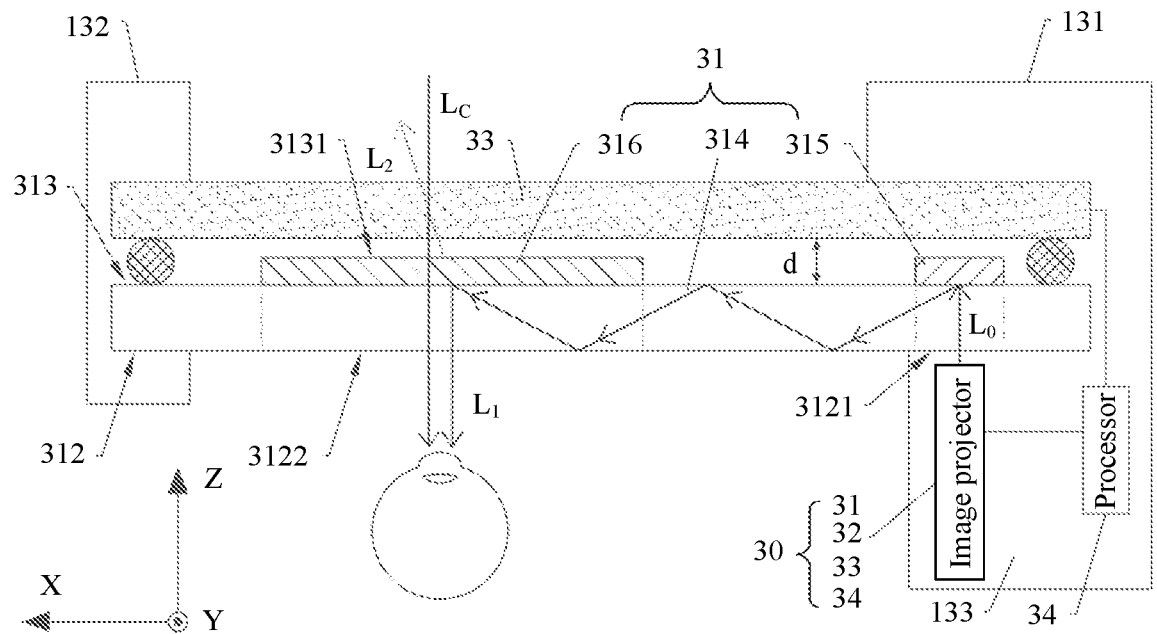
FIG. 4 is a schematic diagram of an enlarged structure of a region A in the structure shown in FIG. 3 in an embodiment.

Refer to FIG. 3 and FIG. 4. FIG. 4 is a schematic diagram of an enlarged structure of a region A in the structure shown in FIG. 3 in an embodiment.

The augmented reality component 30 includes a combiner (combiner) 31, an image projector 32, an active shutter lens 33, and a processor 34. Specifically, the combiner 31 is mounted on the eyeglass frame 10. The combiner 31 includes an inner surface 312 and an outer surface 313 that are disposed opposite to each other. The active shutter lens 33 is mounted on the outer surface 313 of the combiner 31. The image projector 32 is mounted on the eyeglass frame 10. The processor 34 is coupled to the image projector 32 and the active shutter lens 33, to control on and off of the image projector 32 and the active shutter lens 33.

It should be noted that in another embodiment, the two augmented reality components 30 may include only one processor 34, and the processor 34 is coupled to laser projectors 32 of both the two augmented reality components 30, to control on and off of the two laser projectors 32. This is not specifically limited in this application.

The combiner 31 is mounted on the rim 11 of the eyeglass frame 10. In this embodiment, combiners 31 of the two augmented reality components 30 are disposed side by side in the X-axis direction. Specifically, the combiners 31 of the two augmented reality components 30 are mounted on the rim 11 at intervals. The combiner 31 is mounted on the bezel 13 on the rim 11. The inner surface 312 of the combiner 31 is a surface that is of the combiner 31 and that faces an inner side of the rim 11. In other words, the outer surface 313 of the combiner 31 is a surface that is of the combiner 31 and that faces an outer side of the rim 11. In this embodiment, the combiner 31 is a device that combines digital content and a real scene by using a diffractive optical waveguide technology. It should be noted that in another embodiment, the combiner 31 may alternatively be a component that uses a technology such as bird bath (bird bath), a free-form surface, or a reflective array optical waveguide.

Specifically, the combiner 31 includes a diffractive optical waveguide 314, a coupling-in grating 315, and a coupling-out grating 316. The diffractive optical waveguide 314 is mounted on the bezel 13. One end of the diffractive optical waveguide 314 is mounted on the first bezel 131 of the bezel 13, and is accommodated in an accommodating cavity 133 of the first bezel 131. The other end of the diffractive optical waveguide 314 is mounted on the second bezel 133 of the bezel 13. The diffractive optical waveguide 314 includes an inner surface and an outer surface that are disposed opposite to each other. The inner surface of the diffractive optical waveguide 314 is a surface that is of the diffractive optical waveguide 314 and that faces the inner side of the rim 11. In other words, the outer surface of the diffractive optical waveguide 314 is a surface that is of the diffractive optical waveguide 314 and that faces the outer side of the rim 11.

In this embodiment, both the coupling-in grating 315 and the coupling-out grating 316 are blazed gratings. Specifically, the coupling-in grating 315 is mounted on the outer surface of the diffractive optical waveguide 314, and is located in the accommodating cavity 133 of the first bezel 131. The coupling-out grating 316 is mounted on the outer surface of the diffractive optical waveguide 314, is spaced from the coupling-in grating 315, and is located between the first bezel 131 and the second bezel 133. It should be understood that the coupling-in grating 315 and the coupling-out grating 316 may alternatively be transmission gratings. In this case, the coupling-in grating 315 and the coupling-out grating 316 are mounted on the inner surface of the diffractive optical waveguide 314. In addition, the coupling-in grating 315 and the coupling-out grating 316 may alternatively be holographic gratings, tilted gratings, polarization gratings, liquid crystal gratings, holographic optical elements, or diffractive optical elements. This is not specifically limited in this application.

It should be understood that the grating is an optical component including a large quantity of parallel slits of equal widths and equal spacings. When light is incident on a grating surface at a specific angle, the grating can periodically adjust an amplitude or a phase of the light, so that the light is emitted from the grating surface in a direction different from an angle of incidence. Descriptions of the grating below are understood in a same way.

In this embodiment, the inner surface of the diffractive optical waveguide 314 is the inner surface 312 of the combiner 31. The inner surface 312 of the combiner 31 includes a light entrance region 3121 and a light exit region 3122. The light entrance region 3121 on the inner surface 312 is located in the accommodating cavity 133 of the first bezel 131. Specifically, the light entrance region 3121 on the inner surface 312 is a region covered by a projection of the coupling-in grating 315 on the inner surface 312. In other words, a region that is on the inner surface 312 of the combiner 31 and that is opposite to the coupling-in grating 315 is the light entrance region 3121 on the inner surface 312.

The light exit region 3122 on the inner surface 312 is spaced from the light entrance region 3121, and is located between the first bezel 131 and the second bezel 132.

Specifically, the light exit region 3122 on the inner surface 312 is a region covered by a projection of the coupling-out grating 315 on the inner surface 312. In other words, a region that is on the inner surface 312 and that is opposite to the coupling-out grating 315 is the light exit region 3122 on the inner surface 3123.

The outer surface 313 of the combiner 31 includes a surface that is of the coupling-in grating 315 and that is away from the diffractive optical waveguide 314, a surface that is of the coupling-out grating 316 and that is away from the diffractive optical waveguide 314, and a region that is on the outer surface of the diffractive optical waveguide 314 and that is not covered by the coupling-in grating 315 and the coupling-out grating 316. In other words, the outer surface 313 of the combiner 31 includes an outer surface of the coupling-in grating 315, an outer surface of the coupling-out grating 316, and the region that is on the outer surface of the diffractive optical waveguide 314 and that is not covered by the coupling-in grating 315 and the coupling-out grating 316. The outer surface 313 of the combiner 31 includes a light exit region 3131. Specifically, the light exit region 3131 on the outer surface 313 is the surface that is of the coupling-out grating 316 and that is away from the diffractive optical waveguide 314, that is, the outer surface of the coupling-out grating 316.

In this embodiment, the image projector 32 is located in the accommodating cavity 133 of the first bezel 131, and is disposed opposite to the combiner 31. Specifically, the image projector 32 is located on a side that is of the diffractive optical waveguide 314 and that is away from the coupling-in grating 315. In other words, the image projector 32 and the coupling-in grating 315 are separately located on opposite sides of the diffractive optical waveguide 314. The image projector 32 faces the light entrance region 3121 on the inner surface 312. It may be understood that when the coupling-in grating 315 is a transmission grating, the image projector 32 and the coupling-in grating 315 are located on a same side of the diffractive optical waveguide 314. It should be noted that in another embodiment, the image projector 32 may alternatively be located in the accommodating cavity of the temple 12 (that is, an inner side of the temple 12); or the laser projector 32 may be partially located in the accommodating cavity 133 of the first bezel 131, and partially located in the accommodating cavity of the temple 12; or the laser projector 32 may not be located in the accommodating cavity 133 of the first bezel 131 or the accommodating cavity of the temple 12, but is directly exposed on a surface of the bezel 13, provided that a line of sight of the user is not shielded when the augmented reality device 100 is used.

The image projector 32 includes and is not limited to an optical machine such as a liquid crystal on silicon (LCOS), a digital light processor 34 (DLP), a light-emitting diode (LED), an organic light-emitting diode (OLED), a quantum dot light-emitting diode (QLED), an active-matrix organic light-emitting diode (AMOLED), a flexible light-emitting diode (FLED), a mini LED, a micro OLED, a micro LED, or a laser micro electro mechanical system (Laser MEMS).

When the processor 34 turns on the image projector 32, that is, when the image projector 32 is in an on state, the image projector 32 projects display light $L_0$ to the combiner 31, some of the display light $L_0$ is emitted from the inner surface 312 of the combiner 31, and some of the display light $L_0$ is emitted from the outer surface 313 of the combiner 31. The image projector 32 projects the display light $L_0$ that carries digital content, and the display light L0 enters the combiner 31 from the light entrance region 3121 of the inner surface 312, and is emitted through the light exit region 3122 of the inner surface 312 and the light exit region of the outer surface 313.

Specifically, the display light $L_0$ is vertically emitted to the inner surface of the diffractive optical waveguide 314 (that is, the inner surface 312 of the combiner 31), and is vertically emitted to the coupling-in grating 315 from the light entrance region 3121 on the inner surface 312, and is coupled into the diffractive optical waveguide 314 by using the coupling-in grating 315. The coupling-in grating 315 has adjusted a propagation direction of the display light $L_0$ to a state in which a total reflection condition is satisfied. The display light $L_0$ is totally reflected at least once in the diffractive optical waveguide 314 and is propagated in a direction towards the coupling-out grating 316 until the display light $L_0$ reaches the coupling-out grating 316 and is diffracted. After being diffracted, some of the display light $L_0$ is propagated from the light exit region 3122 on the inner surface 312 to the inner side of the combiner 31, that is, is propagated in a direction towards a human eye. In the figure, the some of the display light $L_0$ is denoted as into-eye light $L_1$, and the into-eye light $L_1$ may enter the human eye to form an image, so that the user can see a virtual scene that carries digital content. Meanwhile, after being diffracted, some of the display light $L_0$ is propagated from the light exit region 3131 on the outer surface 313 to an outer side of the combiner 31, and the some of the display light $L_0$ is denoted as leaked light $L_2$ in the figure. It may be understood that when the processor 34 turns off the image projector 32, that is, when the image projector 32 is in an off state, the image projector 32 does not project the display light $L_0$. In this case, neither the into-eye light $L_1$ enters the human eye to form an image nor the leaked light $L_2$ is propagated to the outer side of the combiner 31.

The active shutter lens 33 is located on a side that is of the combiner 31 and that is away from the image projector 32; in other words, the active shutter lens 33 and the image projector 32 are located on opposite sides of the combiner 31. In this embodiment, the active shutter lens 33 is a lens based on an electrochromic material (except liquid crystal). It should be understood that the active shutter lens 33 is a lens that can be quickly turned on or off under the control of the processor 34. When the processor 34 turns on the active shutter lens 33, that is, when the active shutter lens 33 is in an on state, transmittance of the active shutter lens 33 is relatively high, and light may be normally propagated through the active shutter lens 33. When the processor 34 turns off the active shutter lens 33, that is, when the active shutter lens 33 is in an off state, transmittance of the active shutter lens 33 is close to 0, and the active shutter lens 33 shields light; in other words, the light cannot be propagated through the active shutter lens 33; or in other words, the active shutter lens 33 may absorb the light.

In this embodiment, two ends of the active shutter lens 33 may be separately mounted on the outer surface 313 of the combiner 31 by using sealant. There is an air gap between a middle part of the active shutter lens 33 and the outer surface 313 of the combiner 31, to ensure that the display light $L_0$ can be totally reflected in the diffractive optical waveguide. A width d of the air gap is approximately 50 μm. It should be understood that the active shutter lens 33 is not in contact with the coupling-in grating 315 and the coupling-out grating 316 because a thickness of the coupling-in grating 315 and a thickness of the coupling-out grating 316 are at a nanometer level.

Specifically, the active shutter lens 33 covers the outer surface 313 of the combiner 31, to ensure appearance integrity and consistency of the augmented reality device 100, and improve appearance refinement of the augmented reality device 100. In other words, the active shutter lens 33 covers the outer surface of the coupling-in grating 315, the outer surface of the coupling-out grating 316, and a part that is on the outer surface of the diffractive optical waveguide 314 and that is not covered by the coupling-in grating 315 and the coupling-out grating 316. In this case, the active shutter lens 33 may act as protective glass to protect the coupling-in grating 315 and the coupling-out grating 316.

It should be noted that in another embodiment, the active shutter lens 33 may alternatively cover only the light exit region 3131 on the outer surface 313; in other words, the active shutter lens 33 may cover only the outer surface of the coupling-out grating 316. It may be understood that, compared with a case in which the active shutter lens 33 covers only the light exit region 3131 on the outer surface 313, when the active shutter lens 33 covers the outer surface 313 of the combiner 31, not only difficulty in an assembling process of the active shutter lens 33 is reduced, but the active shutter lens 33 does not need to be additionally processed, so that difficulty in processing the active shutter lens 33 is reduced, and production costs of the active shutter lens 33 are reduced.

In this embodiment, the processor 34 is located in the accommodating cavity 133 of the first bezel 131, and is electrically connected to the image projector 32 and the active shutter lens 33. The processor 34 may include one or more processing units. A plurality of processing units may be, for example, application processors (APs), modem processors, graphics processing units (GPUs), image signal processors (ISPs), controllers, video codecs, digital signal processors (DSPs), baseband processors, and/or neural network processing units (NPUs). Different processing units may be independent components, or may be integrated into one or more processors. It should be understood that the processor 34 may be a central processing unit (CPU) of the augmented reality device 100, or may be another processor of the augmented reality device 100.

Specifically, the processor 34 is configured to control on and off of the image projector 32, and synchronously control on and off of the active shutter lens 33. To be specific, the processor 34 turns off the active shutter lens 33 while turning on the image projector 32, and the processor 34 turns on the active shutter lens 33 while turning off the image projector 32. In other words, the processor 34 synchronously switches states of the image projector 32 and the active shutter lens 33.

When the processor 34 turns on the image projector 32 and turns off the active shutter lens 33, that is, when the image projector 32 is in an on state and the active shutter lens 33 is in an off state, the active shutter lens 33 shields the display light $L_0$ emitted from the outer surface 313 of the combiner 31. Specifically, after the display light $L_0$ projected by the image projector 32 enters the combiner 31 from the light entrance region 3121 on the inner surface 312, the incident light $L_1$ is emitted to the human eye from the light exit region 3121 on the inner surface 312 to form an image, and the leaked light $L_2$ is emitted from the light exit region 3131 on the outer surface 313 into the active shutter lens 33. In this case, the active shutter lens 33 is in an off state, and transmittance of the active shutter lens 33 is close to 0. Therefore, the active shutter lens 33 shields the leaked light $L_2$, and this is equivalent to that the active shutter lens 33 absorbs the leaked light $L_2$ to prevent the leaked light $L_2$ emitted from the outer surface 313 of the combiner 31 from being emitted to the external environment through the active shutter lens 33. In this way, the leaked light $L_2$ that carries the digital content is prevented from being leaked, so that not only privacy of the user and sociality of the augmented reality device 100 can be improved, but the leaked light $L_2$ can be prevented from forming a small display window on the surface of the augmented reality device 100, and appearance refinement when the user uses the augmented reality device 100 is improved.

When the processor 34 turns off the image projector 32 and turns on the active shutter lens 33, that is, when the image projector 32 is in an off state and the active shutter lens 33 is in an on state, ambient light $L_c$ may enter the combiner 31 from the outer surface 313 of the combiner 31 through the active shutter lens 33, and is emitted through the inner surface 312 of the combiner 31. In this case, the active shutter lens 33 is in an on state, and transmittance of the active shutter lens 33 is relatively high. Therefore, the ambient light $L_c$ may enter the combiner 31 through the active shutter lens 33, and is propagated from the inner surface 312 of the combiner 31 in a direction towards the human eye, to enter the human eye to form an image. In other words, the human eye may observe the external real scene through the active shutter lens 33 and the combiner 31. In addition, because the image projector 32 is turned off, the image projector 32 does not project the display light $L_0$ that carries the digital content, and neither the into-eye light $L_1$ enters the human eye nor the leaked light $L_2$ is leaked from the augmented reality device 100. In other words, the human eye can only see the external real scene.

In an implementation, the processor 34 includes a control unit and a storage unit. The control unit is configured to control on and off of the image projector 32 and the active shutter lens 33. The storage unit is configured to store preset frequency $f_0$, and the preset frequency $f_0$ is greater than or equal to 60 Hz. Specifically, when the augmented reality device 100 is turned on, the image projector 32 and the active shutter lens 33 are separately in different states in a first time period and a second time period. In the first time period, the image projector 32 is in an on state and the active shutter lens 33 is in an off state. In the second time period, the image projector 32 is in an off state and the active shutter lens 33 is in an on state.

The first time period and the second time period form one period T, and $1/T=f_0$. In other words, T is less than or equal to 1/60 seconds. This means that when the augmented reality device 100 is turned on, one second includes at least 60 periods; in other words, the first time period and the second time period appear at least 60 times in one second. In other words, alternating frequency of the image projector 32 between an on state and an off state is greater than 120 Hz. Alternating frequency of the active shutter lens 33 between an on state and an off state is greater than 120 Hz.

It should be understood that flickering frequency (also referred to as human eye refreshing frequency) that can be perceived by the human eye is 60 Hz. Because preset switching frequency is greater than the human eye refreshing frequency, based on a persistence of vision phenomenon (also referred to as a visual pause phenomenon or a duration of vision effect), when the augmented reality device 100 works, both the display light $L_0$ projected by the image projector 32 and the ambient light $L_c$ enter the human eye; in other words, the human eye can not only see the virtual scene, but can also see the external real scene. In addition, the display light projected from the image projector 32 is not leaked out of the augmented reality device 100. In other words, while the transmittance of the augmented reality device 100 is ensured, the augmented reality device 100 shown in this embodiment can shield display light leaked from the combiner 31. Therefore, not only privacy and sociality of the augmented reality device 100 are improved, but appearance refinement when the user uses the augmented reality device 100 is improved.

Figure 5:
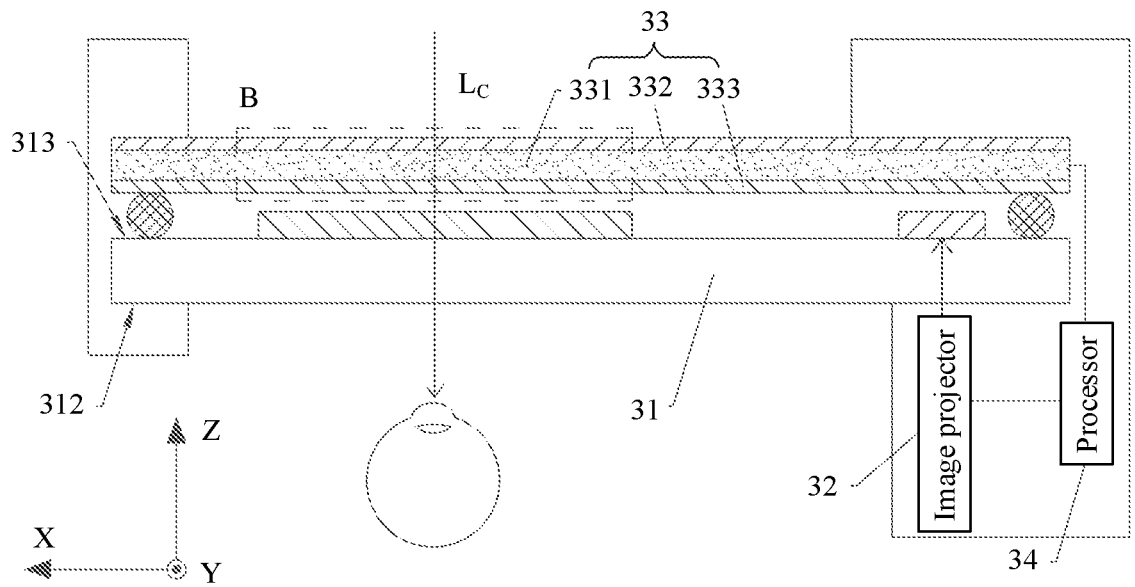
FIG. 5 is a schematic diagram of an enlarged structure of a region A in the structure shown in FIG. 3 in another embodiment.

FIG. 5 is a schematic diagram of an enlarged structure of a region A in the structure shown in FIG. 3 in another embodiment.

A difference between the augmented reality device shown in this embodiment and the augmented reality device 100 shown in the foregoing embodiment lies in that the active shutter lens 33 is a liquid crystal light valve. The active shutter lens 33 includes a liquid crystal box 331, a first polarizer 332, and a second polarizer 333. The liquid crystal box 331 is coupled to the processor 34. The first polarizer 332 is located on a side that is of the liquid crystal box 331 and that is away from the combiner 31, and the first polarizer 332 covers a surface that is of the liquid crystal box 331 and that is away from the combiner 31. In other words, the first polarizer 332 covers a surface of the liquid crystal box 331. The second polarizer 333 is located between the liquid crystal box 331 and the combiner 31. In other words, the second polarizer 333 is located on a side that is of the liquid crystal box 331 and that is away from the first polarizer 332; or in other words, the second polarizer 333 is located on a side that is of the liquid crystal box 331 and that faces the combiner 31. In addition, the second polarizer 333 covers an inner surface of the liquid crystal box 331. In other words, the second polarizer 333 covers a surface that is of the liquid crystal box 331 and that faces the combiner 31. A light transmission axis direction of the first polarizer 332 and a light transmission axis direction of the second polarizer 333 are perpendicular to each other. In other words, a polarization direction of light emitted from the first polarizer 332 is perpendicular to a polarization direction of light emitted from second polarized light 333.

It should be noted that the liquid crystal light valve is an optical component that delays a phase of light by controlling a refractive index of a liquid crystal molecule by using a voltage. Based on a working principle of the liquid crystal molecule, only polarized light in a same direction as a long-axis direction of liquid crystal can pass through the liquid crystal box 331. The first polarizer 332 is configured to change a polarization state of incident light that is emitted to an outer surface of the liquid crystal box 331, and convert the incident light into linearly polarized light, so that the incident light is emitted to the outer surface 313 of the combiner 31 through the liquid crystal box 331 and the second polarizer 333.

Figure 6:
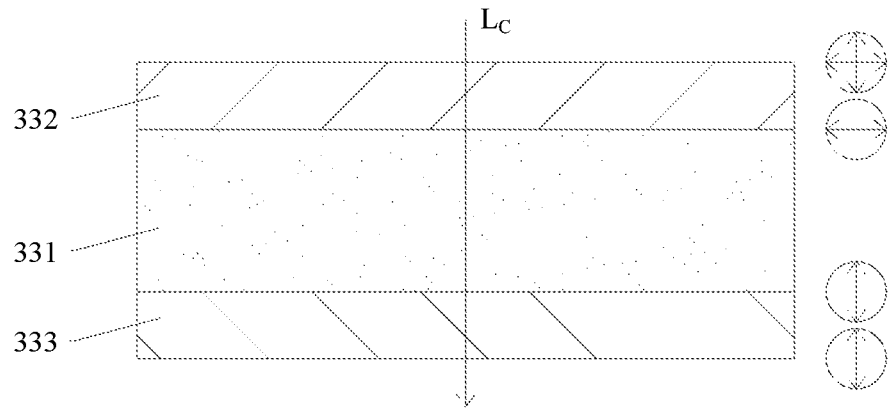
FIG. 6 is a schematic diagram of an enlarged structure of a region B in the structure shown in FIG. 5.

FIG. 6 is a schematic diagram of an enlarged structure of a region B in the structure shown in FIG. 5. It should be noted that, in the accompanying drawings of this application, a straight line with arrows at both ends in a circle on a right side shown in the figure represents a polarization state of light at this interface position. Descriptions of the accompanying drawings are understood in a same way below.

In an implementation, the active shutter lens 33 is an IPS-type liquid crystal light valve.

When the augmented reality device 100 shown in this implementation is worn on the head of the user, and the processor 34 turns on the active shutter lens 33, that is, the active shutter lens 33 is in an on state, the liquid crystal light valve is in a powered-on state, and there is a voltage difference on both sides of a liquid crystal layer in the liquid crystal box 331. The ambient light $L_c$ enters the liquid crystal box 332 after being filtered by the first polarizer 332. The liquid crystal box 331 delays a phase of the light emitted from the first polarizer 332 by 7C, and this is equivalent to that the liquid crystal box 331 rotates a polarization direction of the light emitted from the first polarizer 332 by 90 degrees. Because the light transmission axis direction of the second polarizer 333 and the light transmission axis direction of the first polarizer 332 are perpendicular to each other, the light emitted from the liquid crystal box 331 can be emitted to the outer surface 313 of the combiner 31 through the second polarizer 333. In other words, the ambient light $L_c$ can pass through the active shutter lens 33, and is emitted to the human eye from the inner surface 312 of the combiner 31 to form an image, so that the user can observe the external real scene. In this case, transmittance of natural light of the active shutter lens 33 is between 35% and 50%.

When the processor 34 turns off the active shutter lens 33, that is, when the active shutter lens 33 is in an off state, the liquid crystal light valve is in a powered-off state, and a voltage difference between two sides of the liquid crystal layer in the liquid crystal box 331 is zero. The ambient light $L_c$ enters the liquid crystal box 331 after being filtered by the first polarizer 332, and the liquid crystal box 331 does not change the phase of the light emitted by the first polarizer 332. Because the light transmission axis direction of the second polarizer 333 and the light transmission axis direction of the first polarizer 332 are perpendicular to each other, the light emitted through the liquid crystal box 331 cannot be emitted to the outer surface 313 of the combiner 31 through the second polarizer 333, and is therefore totally blocked by the second polarizer 333. In other words, the ambient light $L_c$ cannot pass through the active shutter lens 33; or in other words, the active shutter lens 33 entirely absorbs the ambient light $L_c$.

In another implementation, the active shutter lens 33 is a TN-type liquid crystal light valve.

When the processor 34 turns on the active shutter lens 33, that is, when the active shutter lens 33 is in an on state, the liquid crystal light valve is in a powered-off state, and a voltage difference between two sides of the liquid crystal layer in the liquid crystal box 331 is zero. The ambient light enters the liquid crystal box 331 after being filtered by the first polarizer 332. The liquid crystal box 331 delays the phase of the light emitted by the first polarizer 332 by 7C. Because the light transmission axis direction of the second polarizer 333 and the light transmission axis direction of the first polarizer 332 are perpendicular to each other, the light emitted from the liquid crystal box 331 can be emitted to the outer surface 313 of the combiner 31 through the second polarizer 333.

When the processor 34 turns off the active shutter lens 33, that is, when the active shutter lens 33 is in an off state, the liquid crystal light valve is in a powered-on state; in other words, there is a voltage difference between two sides of the liquid crystal layer in the liquid crystal box 331, and liquid crystal in the liquid crystal layer is rotated to a state in which the liquid crystal is perpendicular to the first polarizer 33. The ambient light enters the liquid crystal box 331 after being filtered by the first polarizer 332. The liquid crystal box 331 does not change the phase of the light emitted by the first polarizer 332. Because the light transmission axis direction of the second polarizer 333 and the light transmission axis direction of the first polarizer 332 are perpendicular to each other, the light emitted through the liquid crystal box 331 cannot be emitted to the outer surface of the combiner through the second polarizer 333, and is therefore totally blocked by the second polarizer 333.

It should be understood that, in another implementation, the active shutter lens 33 may alternatively be a VA-type liquid crystal light valve, a super twisted nematic liquid crystal light valve, or an FLC-type liquid crystal light valve.

Subsequently, for ease of understanding, when the augmented reality device 100 shown in this embodiment works, working states of the image projector 32 and the active shutter lens 33 in each time period are described as an example. A time period 0 to $t_{12}$ is used as an example for description. The time period 0 to $t_{12}$ includes 12 time periods whose duration is Δt. In other words, $t_n - t_{n-1} = \Delta t$, where n is an integer greater than or equal to 1 and less than or equal to 12.

Figure 7:
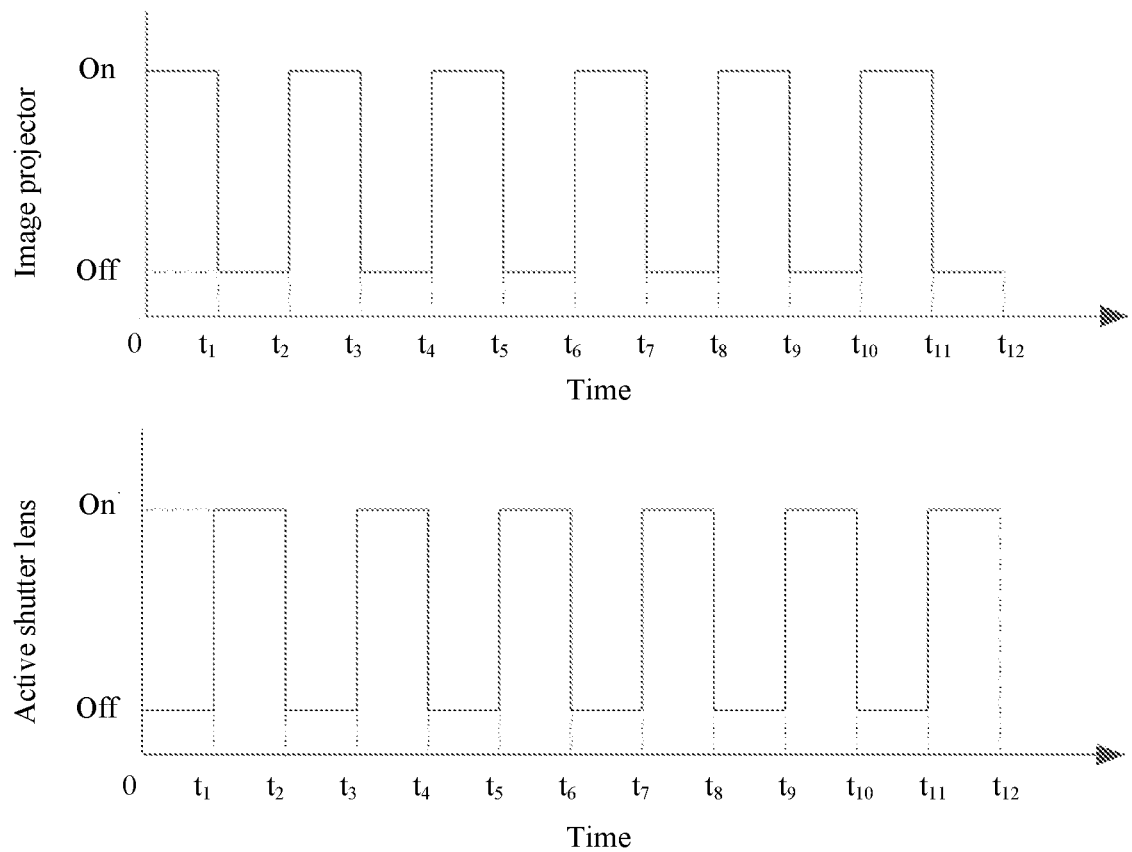
FIG. 7 is a schematic diagram of working states of an image projector and an active shutter lens of an augmented reality device shown in FIG. 5.

FIG. 7 is a schematic diagram of working states of the image projector 32 and the active shutter lens 33 when the augmented reality device 100 shown in FIG. 5 works.

In this embodiment, when the augmented reality device 100 works, in time periods 0 to $t_1$, $t_2$ to $t_3$, $t_4$ to $t_5$, $t_6$ to $t_7$, $t_8$ to $t_9$, and $t_{10}$ to $t_{11}$, the processor 34 turns on the image projector 32 and turns off the active shutter lens 33, to ensure that the display light projected by the image projector 32 is not leaked out of the augmented reality device 100. In time periods $t_1$ to $t_2$, $t_3$ to $t_4$, $t_5$ to $t_6$, $t_7$ to $t_8$, $t_9$ to $t_{10}$, and $t_{11}$ to $t_{12}$, the processor 34 turns off the image projector 32 and turns on the active shutter lens 33, and the human eye can see the external real scene through the active shutter lens 33 and the combiner 31. In other words, the time periods 0 to $t_1$, $t_2$ to $t_3$, $t_4$ to $t_5$, $t_6$ to $t_7$, $t_8$ to $t_9$, and $t_{10}$ to $t_{11}$ are all the first time period mentioned above, and time periods $t_1$ to $t_2$, $t_3$ to $t_4$, $t_5$ to $t_6$, $t_7$ to $t_8$, $t_9$ to $t_{10}$, and $t_{11}$ to $t_{12}$ are all the second time period mentioned above. Time periods 0 to $t_2$, $t_2$ to $t_4$, $t_4$ to $t_6$, $t_6$ to $t_8$, $t_8$ to $t_{10}$, and $t_{10}$ to $t_{12}$ are all the period T mentioned above, and T=2Δt.

In this case, in the time period 0 to $t_{12}$, total duration of the image projector 32 in an on state (that is, in an off state of the active shutter lens 33) is 6Δt, and a proportion of the duration is 50%. Total duration of the image projector 32 in an off state (that is, in an on state of the active shutter lens 33) is 6Δt, and a proportion of the duration is 50%. In other words, the transmittance of the augmented reality device 100 is between 17.5% and 25%.

It may be understood that, in the augmented reality device 100 shown in this embodiment, the transmittance of the augmented reality device 100 may be adjusted by adjusting time proportions of the image projector 32 in an on state and an off state (that is, the active shutter lens 33 is in an on state and an off state). For example, when a proportion of duration of the image projector 32 in an on state in an entire period is 20%, that is, when a proportion of duration of the image projector 32 in an off state in the entire period is 80%, the transmittance of the augmented reality device 100 is decreased by 20%; in other words, the transmittance of the augmented reality device 100 is between 28% and 40%; in other words, the leaked light $L_2$ of the combiner 31 can be shielded while the transmittance of the augmented reality device 100 is ensured.

It should be noted that, in actual application, because a response time (at a millisecond level) for turning off the liquid crystal light valve is far longer than a response time (at a microsecond or nanosecond level) for turning on the image projector 32, to ensure that the active shutter lens 33 can effectively shield the leaked light $L_2$ in a timely manner, a time point at which the active shutter lens 33 is turned off should not be later than a time point at which the image projector 32 is turned on. In other words, the time point at which the active shutter lens 33 is turned off should be earlier than the time point at which the image projector 32 is turned on, or the time point at which the active shutter lens 33 is turned off should be the same as the time point at which the image projector 32 is turned on. It is assumed that the response time of the liquid crystal light valve is $t_r$, the time point at which the active shutter lens 33 is turned off needs to be $t_r$ ahead of the time point at which the image projector 32 is turned on.

In this embodiment, the response time for turning off the liquid crystal light valve is approximately 1 ms to 2 ms; in other words, the active shutter lens 33 may start to be turned off in 1 ms to 2 ms before the image projector 32 is turned on, to ensure that the active shutter lens 33 can entirely shield the leaked light $L_2$ in a timely manner.

Figure 8:
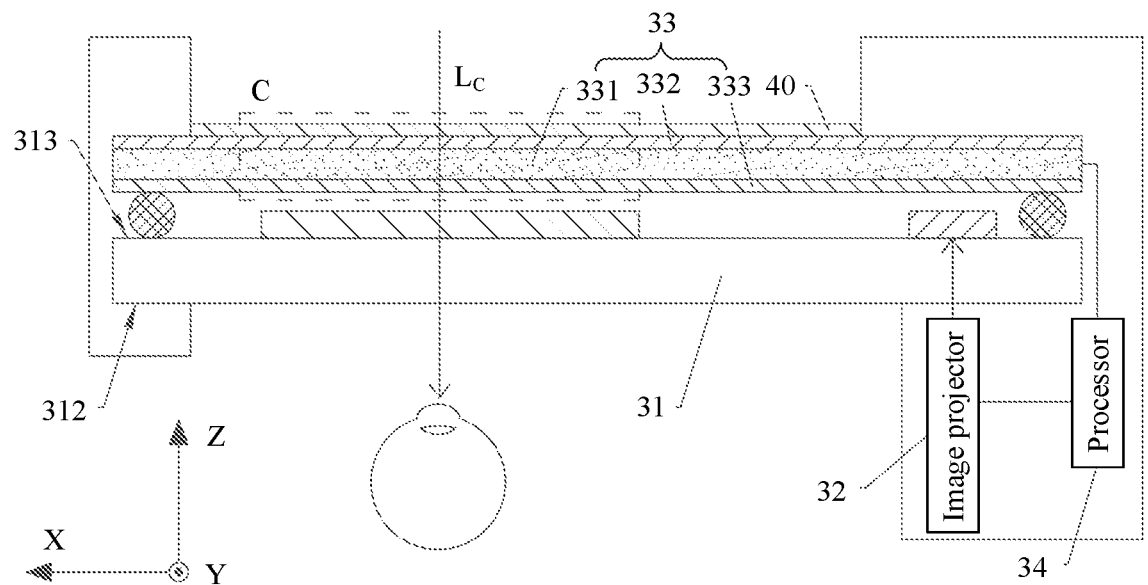
FIG. 8 is a schematic diagram of an enlarged structure of a region A in the structure shown in FIG. 3 in a third embodiment.

FIG. 8 is a schematic diagram of an enlarged structure of a region A in the structure shown in FIG. 3 in a third embodiment.

A difference between the augmented reality device shown in this embodiment and the augmented reality device 100 shown in the foregoing second embodiment lies in that the augmented reality device 100 further includes a quarter-wave plate 40 (also referred to as a quarter delay plate), and the quarter-wave plate 40 covers a surface that is of the polarizer 332 and that is away from the liquid crystal box 331; in other words, the quarter-wave plate 40 covers the outer surface of the polarizer 332. The quarter-wave plate is a birefringent single crystal waveplate with a specific thickness. When light is emitted to the quarter-wave plate, birefringence occurs, and the light is divided into normal light and non-normal light. The normal light is light that complies with the law of refraction, the non-normal light is light that does not comply with the law of refraction, and a phase difference between the normal light and the non-normal light is equal to π/2 or an odd multiple of π/2. In this embodiment, the quarter-wave plate is an achromatic quarter-wave plate; in other words, a phase delay of the waveplate for light on a visible spectrum is all π/2, to ensure that visible light in the ambient light can enter the human eye to form an image.

Figure 9:
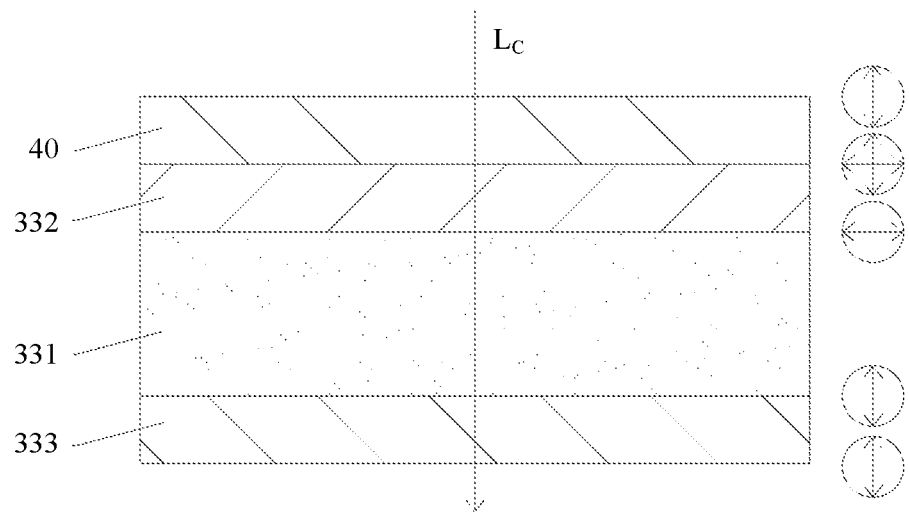
FIG. 9 is a schematic diagram of an enlarged structure of a region C in the structure shown in FIG. 8.

FIG. 9 is a schematic diagram of an enlarged structure of a region C in the structure shown in FIG. 8.

In this embodiment, an included angle between a fast-axis direction of the quarter-wave plate 40 and the light transmission axis direction of the first polarizer 332 is 45 degrees. In other words, a fast axis of the quarter-wave plate 40 is set to form an included angle of 45 degrees between the fast axis of the quarter-wave plate 40 and a polarization direction of linearly polarized light that can pass through the first polarizer 332. It should be understood that a majority of electronic screens commonly used in current life are liquid crystal displays (LCDs), and light emitted from the liquid crystal display is linearly polarized light. When the augmented reality device 100 shown in this embodiment is worn on the head of the user and the electronic screen is observed by using the augmented reality device 100, in a process in which a line of sight rotates around the electronic screen, regardless of whether a polarization state of light emitted from the electronic screen is perpendicular to or parallel to the light transmission axis direction of the polarizer 332, the quarter-wave plate 40 converts linearly polarized light emitted from the electronic screen into circularly polarized light, to attenuate the light emitted from the electronic screen by 50%. When the processor turns on the active shutter lens 33, the first polarizer 332 converts the circularly polarized light into linearly polarized light, and the linearly polarized light enters the liquid crystal box 331, and is emitted to the human eye through the liquid crystal box 331 and the combiner 31, to reduce a brightness difference existing when the user observes the electronic screen. This helps improve user experience when the user wears the augmented reality device 100 to observe the electronic screen.

In other words, when the augmented reality device 100 shown in this embodiment is worn on the head of the user, the augmented reality device 100 does not need to be removed, and only the active shutter lens 33 needs to be turned on to observe an electronic screen in a surrounding environment, so that convenience of using the augmented reality device 100 is improved.

In this embodiment, the active shutter lenses 33 of the two augmented reality components 30 each include the liquid crystal box 331, the first polarizer 332, and the second polarizer 333. The liquid crystal box 331 is coupled to the processor 34, the first polarizer 332 covers the outer surface of the liquid crystal box 331, and the second polarizer 333 covers the inner surface of the liquid crystal box 331. When the processor 34 turns on the active shutter lens 33, after being filtered by the first polarizer 332, the ambient light $L_c$ may be emitted to the outer surface 313 of the combiner 31 sequentially through the liquid crystal box 331 and the second polarizer 333, and be emitted to the human eye from the inner surface 312 of the combiner 31, so that both the left eye and the right eye of the user can observe an external real environment through the active shutter lens 33 and the combiner 31.

Specifically, there are two quarter-wave plates 40. One quarter-wave plate 40 covers an outer surface of one first polarizer 332, and an included angle between a fast-axis direction of the quarter-wave plate 40 and a light transmission axis direction of the first polarizer 332 is degrees. The other quarter-wave plate 40 covers an outer surface of the other first polarizer 332, and an included angle between a fast-axis direction of the quarter-wave plate 40 and a polarization direction of the first polarizer 332 is 45 degrees. In other words, an included angle between a fast-axis direction of each quarter-wave plate 40 and a light transmission axis direction of a first polarizer 332 covered by the quarter-wave plate 40 is 45 degrees, to ensure that when the user wears the augmented reality device 100 to observe the electronic screen, and lines of sight of the two eyes rotate around the electronic screen, a brightness difference between the electronic screen observed by the two eyes is relatively small, and comfort when the user wears the augmented reality device 100 to observe the electronic screen is improved.

The light transmission axis directions of the two first polarizers 332 are the same, and an included angle between fast-axis directions of the two quarter-wave plates 40 is 90 degrees; or an included angle between light transmission axis directions of the two first polarizers 332 is 90 degrees, and fast-axis directions of the two quarter-wave plates 40 are the same, to ensure that polarized light whose polarization directions are perpendicular to each other, such as left and right polarized light, separately pass through the two augmented reality components 30, so that the augmented reality device 100 can be further used in a three-dimensional (3D) movie theater. In other words, the augmented reality device 100 shown in this implementation may not only be used to observe a display picture in which virtuality and reality are combined, but may also be used to watch a 3D video when the processor 34 turns on the active shutter lens 33. In other words, the augmented reality device 100 may be compatible with two projection manners: a polarization manner and an active shutter manner.

Figure 10:
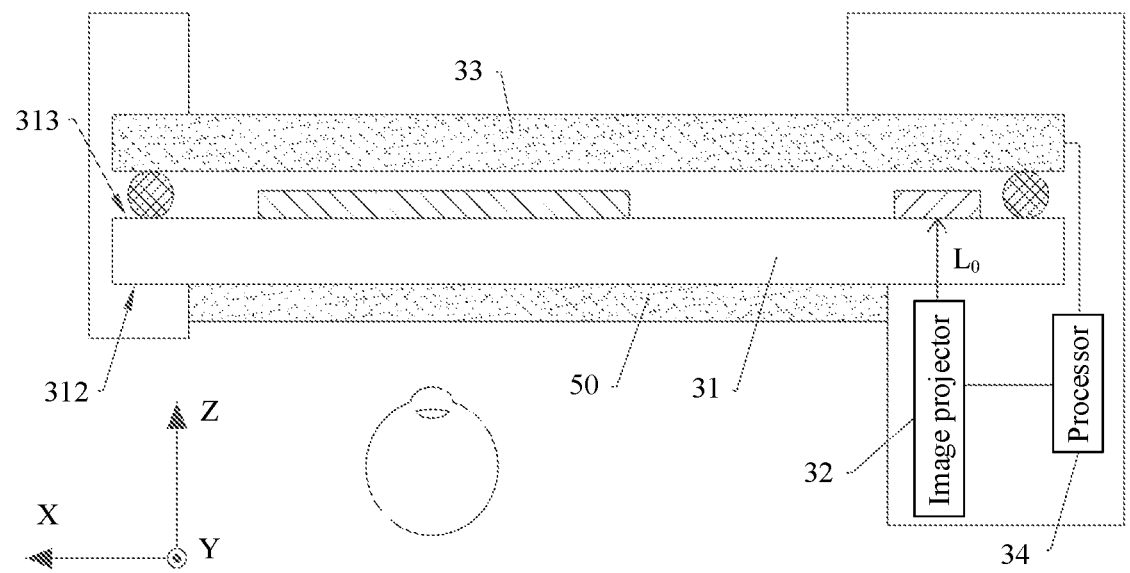
FIG. 10 is a schematic diagram of an enlarged structure of a region A in the structure shown in FIG. 3 in a fourth embodiment.

FIG. 10 is a schematic diagram of an enlarged structure of a region A in the structure shown in FIG. 3 in a fourth embodiment.

A difference between the augmented reality device shown in this embodiment and the foregoing first augmented reality device 100 lies in that the augmented reality device 100 further includes a varifocal lens 50. The varifocal lens 50 is mounted on the inner surface 312 of the combiner 31, and covers the inner surface 312 of the combiner 31. In other words, the varifocal lens 50 is located on a side that is of the combiner 31 and that is close to the human eye, to correct vision of the user. When the user has a visual problem such as shortsightedness, farsightedness, or astigmatism, the varifocal lens 50 may correct ametropia of the user when the user observes an external real scene or a virtual scene that carries digital content, so that clarity achieved when the user observes the virtual scene or the external real scene is improved, and user experience of the user of using the augmented reality device 100 is improved. The varifocal lens 50 may be a component that can implement zooming, such as a liquid crystal lens, a liquid lens, an Alvarez lens, or a mechanical zooming lens. It should be understood that the varifocal lens 50 may be an optical component that has fixed focal power, such as a lens with diopter, or may be an optical component that is coupled to the processor 34 and that has adjustable focal power. When using the augmented reality device 100, the user may adjust the focal power of the varifocal lens 50 based on diopter of the user to match the vision of the user, to improve adaptation of the augmented reality device 100, and improve use flexibility of the augmented reality device 100.

Figure 11:
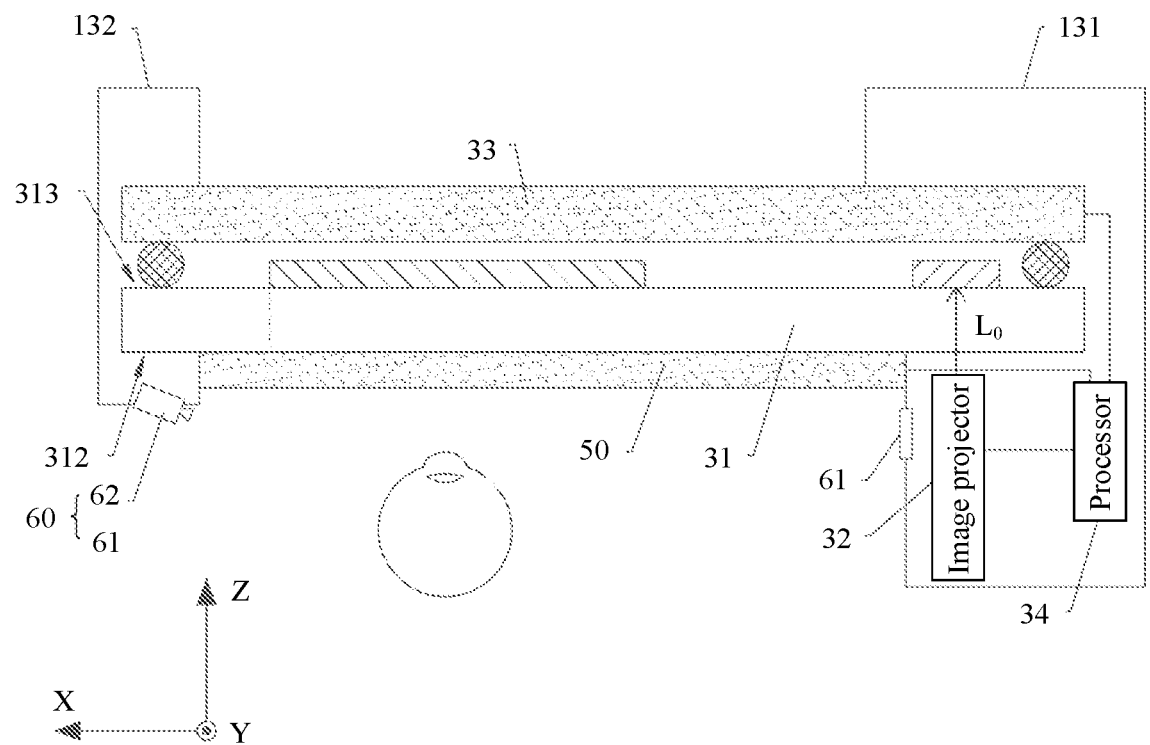
FIG. 11 is a schematic diagram of an enlarged structure of a region A in the structure shown in FIG. 3 in a fifth embodiment.

FIG. 11 is a schematic diagram of an enlarged structure of a region A in the structure shown in FIG. 3 in a fourth embodiment.

A difference between the augmented reality device 100 shown in this embodiment and the foregoing third augmented reality device 100 lies in that the augmented reality device 100 further includes an eyeball tracking component 60. The eyeball tracking component 60 is mounted on the eyeglass frame 10 to track a line of sight of an eyeball. The processor 34 is coupled to the varifocal lens 50 and the eyeball tracking assembly 60 to adjust the focal power of the varifocal lens 50.

In this embodiment, the eyeball tracking component 60 is mounted on the rim 11 of the eyeglass frame 10, and faces the inner side of the rim 11. The eyeball tracker 60 includes one or more infrared light-emitting diodes (IR LEDs) 61 and one or more infrared cameras (IR cameras) 62. Specifically, the infrared light-emitting diode 61 is mounted on the first bezel 131, and faces the inner side of the rim 11. The infrared camera 62 is mounted on the second bezel 133, and faces the inner side of the eyeglass frame 11. The infrared light-emitting diode 61 emits infrared light, and the infrared light enters the eyeball of the user. After being reflected by the cornea of the user, the infrared light enters the infrared camera 52 to form an image. The processor 34 determines an optical axis direction of the user by determining a spot position of the infrared light in the image, and then determines a line of sight direction of the user after calibration. It should be noted that the eyeball tracker 60 in this embodiment is not limited to the foregoing eyeball tracking technology, and all other eyeball tracking technologies are feasible. This is not specifically limited in this application.

When the processor 34 turns off the image projector 32 and adjusts focal power of the varifocal lens 50 to first focal power, that is, when the image projector 32 is in an off state and the focal power of the varifocal lens 50 is the first focal power, the varifocal lens 50 may correct the ametropia of the user when the user observes the external real scene, so that clarity achieved when the user observes the real scene is improved, and user experience of the user is improved. When the user has a visual problem such as shortsightedness, farsightedness, or astigmatism, the first focal power is diopter of the eyeball of the user.

When the processor 34 turns on the image projector 32, that is, when the image projector 32 is in an on state, the eyeball tracking component 60 obtains a vergence depth of the virtual scene observed by the eyeball, and the processor 34 adjusts the focal power of the varifocal lens 50 to second focal power based on an obtaining result of the eyeball tracking component 60. Specifically, the eyeball tracking component 60 tracks the line of sight of the eyeball, and determines, based on a line of sight direction of the user, the vergence depth of the virtual scene observed by the user. The processor 34 changes a virtual image distance of the virtual scene based on the vergence depth, and adjusts a position of the virtual scene to the vergence depth. The second focal power is a sum of the first focal power and a reciprocal of a depth of a virtual image observed by the user. In this case, the varifocal lens 50 can not only correct the ametropia of the user when the user observes virtual digital content, improve clarity achieved when the user observes the digital content, and improve use experience of the user, but can also change a virtual image distance of the digital content, resolve a vergence-accommodation conflict (VAC), reduce discomfort when the user uses the augmented reality device 100, and improve comfort when the user uses the augmented reality device 100.

Subsequently, for ease of understanding, working states of the image projector 32, the active shutter lens 33, and the varifocal lens 50 in each time period when the augmented reality device 100 works are described. That both eyes of the user have ametropia of $D_0$ (for example, −4.0 D) in the time period 0 to $t_{12}$ is used as an example for description.

Figure 12:
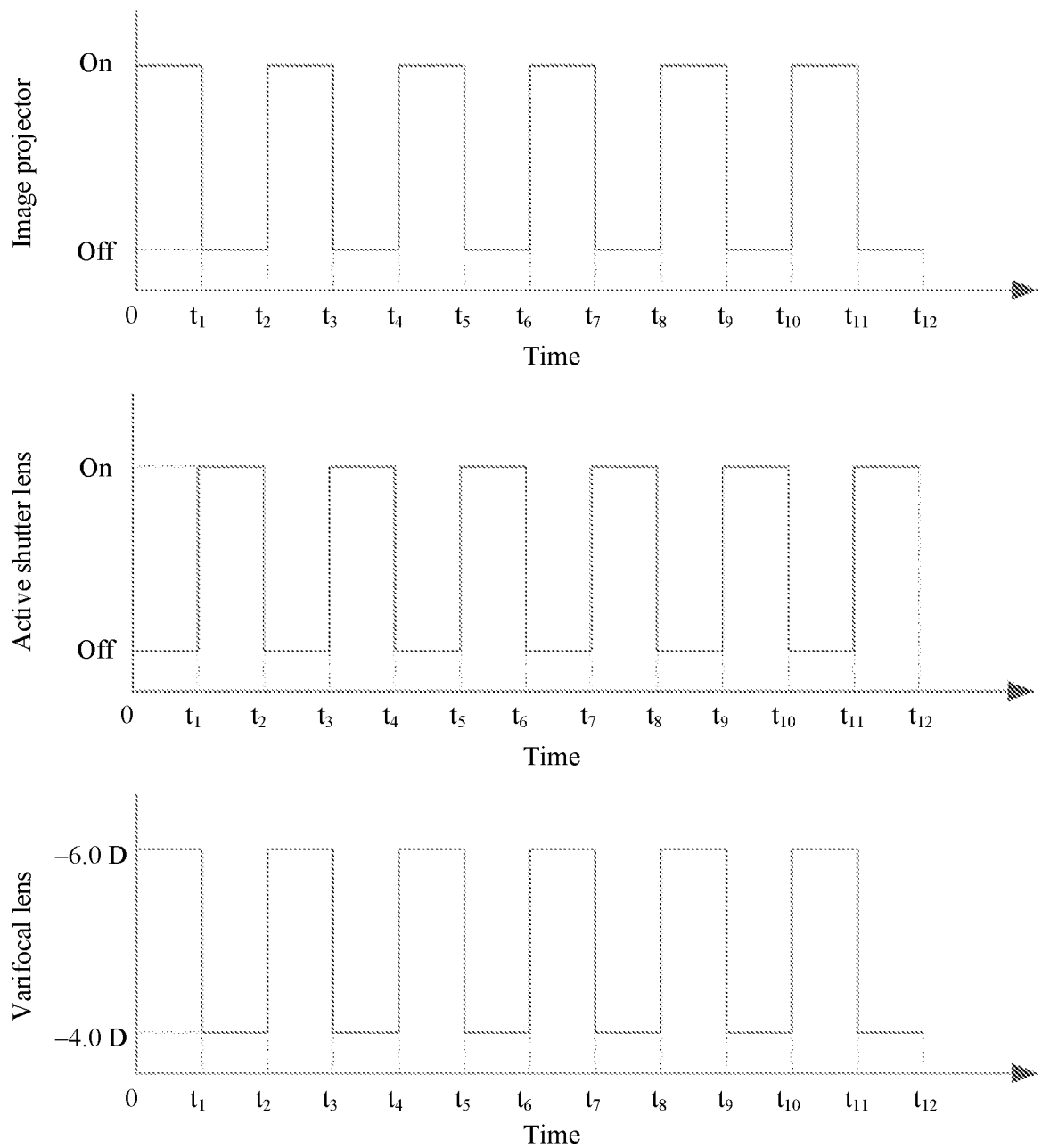
FIG. 12 is a schematic diagram of working states of an image projector, an active shutter lens, and a varifocal lens of an augmented reality device shown in FIG. 11.

FIG. 12 is a schematic diagram of working states of the image projector 32, the active shutter lens 33, and the varifocal lens 50 when the augmented reality device 100 shown in FIG. 11 works.

In this embodiment, when the augmented reality device 100 works, in time periods 0 to $t_1$, $t_2$ to $t_3$, $t_4$ to $t_5$, $t_6$ to $t_7$, $t_8$ to $t_9$, and $t_{10}$ to $t_{11}$, the image projector 32 is in an on state, and the active shutter lens 33 is in an off state. The processor 34 determines, based on the line of sight direction of the user obtained by the eyeball tracker 60, that a depth of a virtual image observed by the user is L (for example, 0.5 m). In this case, a reciprocal ΔD of the depth of the virtual image is 1/L (for example, −2.0 D), and the focal power of the varifocal lens 50 is adjusted to $D_0$+ΔD (for example, −6.0 D). In this case, the second focal power of the varifocal lens 50 is $D_0$+ΔD, so that it can be ensured that the display light projected by the image projector 32 is not leaked out of the augmented reality device 100, and it can also be ensured that the user can clearly observe the digital content. In time periods $t_1$ to $t_2$, $t_3$ to $t_4$, $t_5$ to $t_6$, $t_7$ to $t_8$, $t_9$ to $t_{10}$, and $t_{11}$ to $t_{12}$, the image projector 32 is in an off state, the active shutter lens 33 is in an on state, and the processor 34 adjusts the focal power of the varifocal lens 50 to $D_0$. In this case, the first focal power of the varifocal lens 50 is $D_0$, to ensure that the human eye can clearly see the external real scene through the active shutter lens 33 and the combiner 31.

This application further provides a display method for any one of the foregoing augmented reality devices 100. The display method includes the following:

In a first time period, the image projector 32 is turned on, the active shutter lens 33 is turned off, and the image projector 32 projects display light $L_0$ to the combiner 31. Some of the display light $L_0$ is emitted from the inner surface 312 of the combiner 31, some of the display light $L_0$ is emitted from the outer surface 313 of the combiner 31, and the active shutter lens 33 shields the display light $L_0$ emitted from the outer surface 313 of the combiner 31. Specifically, the processor 34 turns on the image projector 32 and turns off the active shutter lens 33. The active shutter lens 32 prevents the display light $L_0$ emitted from the outer surface 313 of the combiner 31 from being emitted to an external environment, and prevents the display light $L_0$ that carries digital content from being leaked. This can not only improve privacy of the user and sociality of the augmented reality device 100, but can also prevent the leaked display light $L_0$ from forming a small display window on a surface of the augmented reality device 100, so that appearance refinement when the user uses the augmented reality device 100 is improved.

In a second time period, the image projector 32 is turned off, and the active shutter lens 33 is turned on. After passing through the active shutter lens 33, ambient light $L_c$ enters the combiner 31 from the outer surface 313 of the combiner 31, and is emitted from the inner surface 312 of the combiner 31. Specifically, the processor 34 turns off the image projector 32 and turns on the active shutter lens 33. The user can observe an external real scene through the combiner 31 and the active shutter lens 33, to ensure that the augmented reality device 100 has specific transmittance. A length of the second time period is equal to a length of the first time period. It should be noted that in another embodiment, the length of the second time period may alternatively be greater than or less than the length of the first time period. This is not specifically limited in this application.

In this embodiment, the first time period and the second time period are alternated. The first time period and the second time period form one period, and one period is less than or equal to 1/60 seconds. It should be understood that flickering frequency that can be perceived by the human eye is 60 Hz. One period is less than or equal to 1/60 seconds. In other words, one second includes at least 60 periods. In other words, the first time period and the second time period appear at least 60 times in one second. In this case, alternating frequency between the first time period and the second time period is greater than 120 Hz. Based on a persistence of vision phenomenon (also referred to as a visual pause phenomenon or a duration of vision effect), the human eye cannot perceive switching between the virtual scene and the external real scene, and this is equivalent to that the human eye can not only see the virtual scene, but can also see the external real scene. In other words, the display light $L_0$ leaked from the combiner may be shielded while the transmittance of the augmented reality device 100 is ensured.

It should be noted that in the display method for the augmented reality device shown in this embodiment, the transmittance of the augmented reality device 100 may be adjusted by adjusting a time proportion of the first time period and a time proportion of the second time period. For example, when the time proportion of the first time period accounts for 20% of an entire period, the transmittance of the augmented reality device 100 is decreased by only 20%; in other words, while the transmittance of the augmented reality device 100 is ensured, leaked light $L_2$ of the combiner 31 is shielded.

The foregoing descriptions are merely specific implementations of this application, but are not intended to limit the protection scope of this application. Any variation or replacement readily figured out by a person skilled in the art within the technical scope disclosed in this application shall fall within the scope of the disclosure. Therefore, the protection scope of this application shall be subject to the protection scope of the claims.

What is claimed is:

1. An augmented reality device, comprising:
an eyeglass frame,
a combiner mounted on the eyeglass frame, the combiner including an inner surface and an outer surface disposed opposite the inner surface,
an active shutter lens mounted on the outer surface of the combiner,
an image projector mounted on the eyeglass frame and configured to project display light to the combiner such that a first portion of the display light is emitted from the inner surface of the combiner and a second portion of the display light is emitted from the outer surface of the combiner, and
a processor coupled to the image projector and the active shutter lens, the processor being configured to:
turn on the image projector and turn off the active shutter lens, and
turn off the image projector and turn on the active shutter lens,
wherein the active shutter lens is configured to shield the second portion of the display light emitted from the outer surface of the combiner, and
wherein the combiner is configured to emit, from the inner surface of the combiner, ambient light that enters the combiner from the outer surface of the combiner after passing through the active shutter lens.

2. The augmented reality device according to claim 1, wherein the active shutter lens covers the outer surface of the combiner.

3. The augmented reality device according to claim 1, wherein the active shutter lens comprises:
a liquid crystal box coupled to the processor,
a first polarizer located on a first side of the liquid crystal box distal from the combiner, and
a second polarizer located between the liquid crystal box and the combiner,
wherein an included angle between a light transmission axis direction of the first polarizer and a light transmission axis direction of the second polarizer is 90 degrees.

4. The augmented reality device according to claim 3, further comprising a quarter-wave plate mounted on an outer surface of the first polarizer,
wherein an included angle between a fast-axis direction of the quarter-wave plate and the light transmission axis direction of the first polarizer is 45 degrees.

5. The augmented reality device according to claim 1, wherein the augmented reality device comprises two a first augmented reality component and a second augmented reality component mounted on the eyeglass frame at intervals, wherein the first augmented reality component includes the combiner, the active shutter lens, and the image projector, wherein the second augmented reality component includes a second combiner, a second active shutter lens, and a second image projector, and wherein the combiner and the second combiner are disposed side by side.

6. The augmented reality device according to claim 5, wherein the active shutter lens and the second active shutter lens each comprises a respective liquid crystal box coupled to the processor, a respective first polarizer located on a side of the liquid crystal box distal from a corresponding respective combiner, and a respective second polarizer located between the corresponding respective liquid crystal box and the corresponding respective combiner, and
wherein a respective included angle between a respective light transmission axis directions of the respective first polarizer and of the respective second polarizer of each respective augmented reality component is 90 degrees.

7. The augmented reality device according to claim 6, further comprising a first quarter-wave plate mounted on an outer surface of the first polarizer of the first augmented reality component, wherein an included angle between a fast-axis direction of the first quarter-wave plate and a light transmission axis direction of the first polarizer of the first augmented reality component is 45 degrees; and
a second quarter-wave plate is-mounted on an outer surface of the first polarizer of the second augmented reality component, wherein an included angle between a fast-axis direction of the second quarter-wave plate and a light transmission axis direction of the first polarizer of the second augmented reality component is 45 degrees.

8. The augmented reality device according to claim 7, wherein the light transmission axis direction of the first polarizer of the first augmented reality component is the same as the light transmission axis direction of the first polarizer of the second augmented reality component, and an included angle between the fast-axis directions of the two respective quarter-wave plates is 90 degrees; or
an included angle between the light transmission axis directions of the two respective first polarizers is 90 degrees, and the fast-axis direction of the first quarter-wave plate of the first augmented reality component is the same as the fast-axis direction of the second quarter-wave plate of the second augmented reality component.

9. The augmented reality device according to claim 1, further comprising a varifocal lens mounted on the inner surface of the combiner.

10. The augmented reality device according to claim 9, further comprising an eyeball tracking component mounted on the eyeglass frame,
wherein the processor is further coupled to the varifocal lens and the eyeball tracking component;
wherein the processor is further configured to:
turn off the image projector and adjust focal power of the varifocal lens to a first focal power,
turn on the image projector, and
adjust the focal power of the varifocal lens to a second focal power based on an obtaining result of the eyeball tracking component, and
wherein the eyeball tracking component is configured to obtain a vergence depth of a virtual scene observed by the eyeball.

11. A display method for the augmented reality device according to claim 1, the display method comprising:
in a first time period:
turning on the image projector and turning off the active shutter lens,
projecting, by the image projector, the display light to the combiner, wherein the first portion of the display light is emitted from the inner surface of the combiner, and the second portion of the display light is emitted from the outer surface of the combiner, and shielding, by the active shutter lens, the second portion of the display light emitted from the outer surface of the combiner; and in a second time period:

turning off the image projector and turning on the active shutter lens, emitting, from the inner surface of the combiner, the ambient light that enters the combiner from the outer surface of the combiner after passing through the active shutter lens.

12. The display method for the augmented reality device according to claim 11, wherein the first time period and the second time period are alternated.

13. The display method for the augmented reality device according to claim 12, wherein the first time period and the second time period form one cycle, wherein the duration of the cycle is less than or equal to $1/60$ seconds.

* * * * *

UNITED STATES PATENT AND TRADEMARK OFFICE
CERTIFICATE OF CORRECTION

| | |
|---|---|
| PATENT NO. | : 11,914,155 B2 |
| APPLICATION NO. | : 17/915401 |
| DATED | : February 27, 2024 |
| INVENTOR(S) | : Zhu et al. |

It is certified that error appears in the above-identified patent and that said Letters Patent is hereby corrected as shown below:

In the Claims

Claim 5: Column 23, Line 53: "wherein the augmented reality device comprises two a first" should read -- wherein the augmented reality device comprises a first --.

Claim 6: Column 24, Line 4: "light transmission axis directions of the respective first" should read -- light transmission axis direction of the respective first --.

Claim 7: Column 24, Line 15: "a second quarter-wave plate is-mounted on an outer" should read -- a second quarter-wave plate mounted on an outer --.

Claim 13: Column 25, Line 17: "the cycle is less than or equal to 1/60 seconds." should read -- the cycle is less than or equal to 1/60 second. --.

Signed and Sealed this
Eleventh Day of June, 2024

Katherine Kelly Vidal
*Director of the United States Patent and Trademark Office*